March 16, 1954  P. P. NEWCOMB  2,672,278
LUBRICATION SYSTEM FOR GAS TURBINE POWER PLANTS
Filed July 14, 1951  2 Sheets-Sheet 1
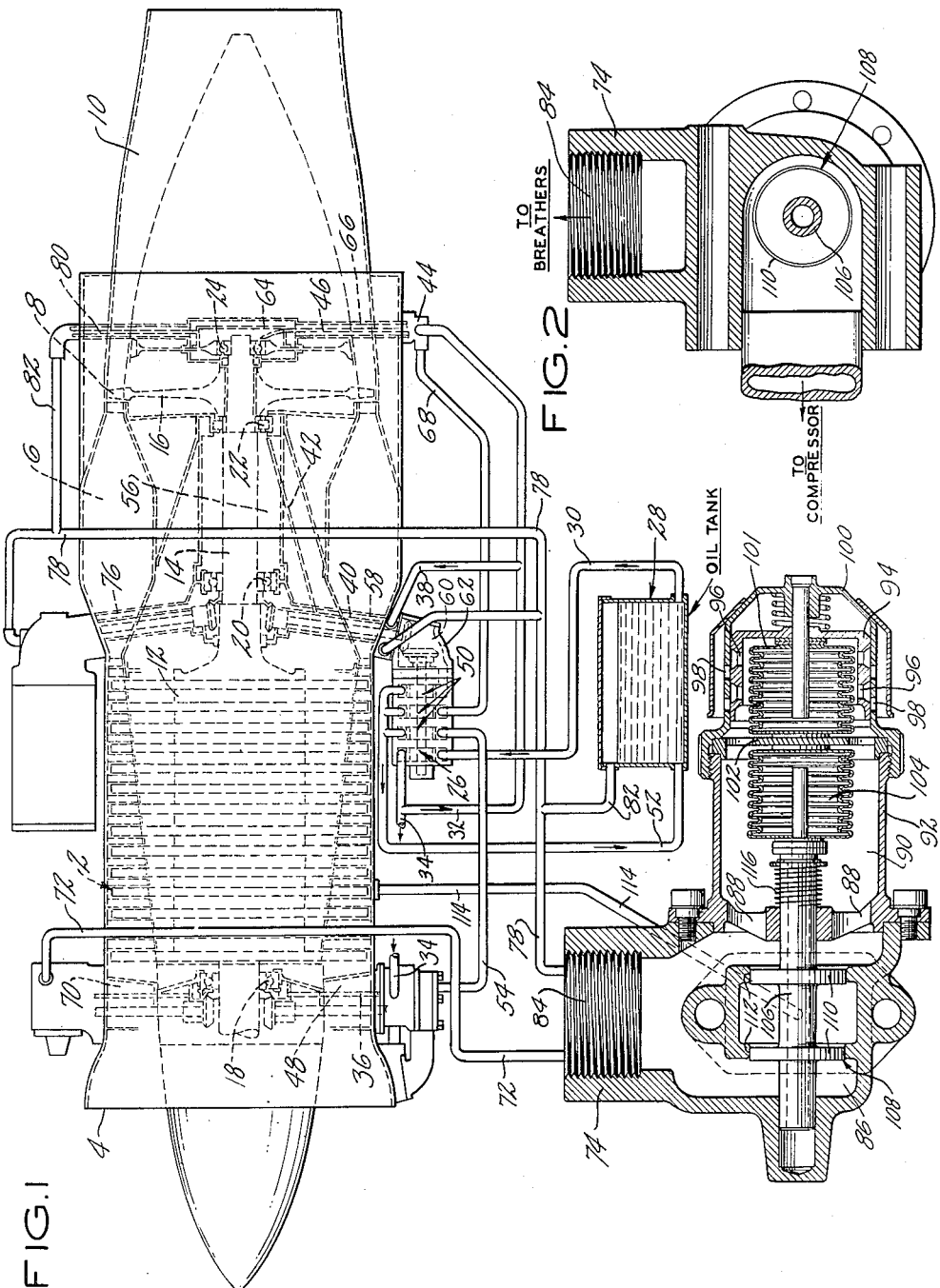
Inventor
Philip P. Newcomb
by Charles A. Warren
Attorney March 16, 1954 P. P. NEWCOMB 2,672,278
LUBRICATION SYSTEM FOR GAS TURBINE POWER PLANTS
Filed July 14, 1951 2 Sheets-Sheet 2
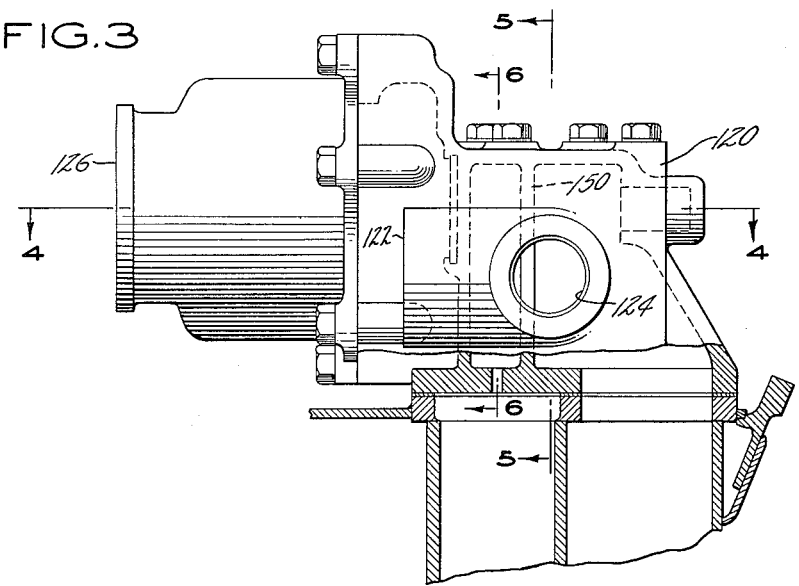
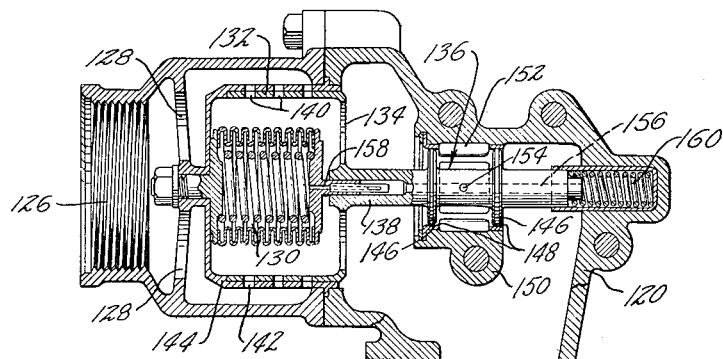
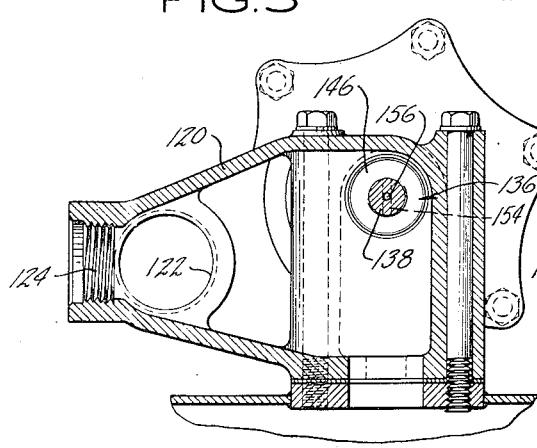
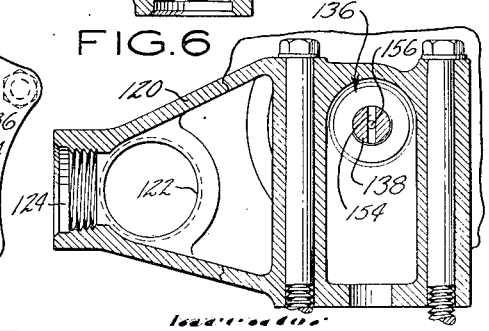

Patented Mar. 16, 1954

2,672,278

UNITED STATES PATENT OFFICE 2,672,278

LUBRICATION SYSTEM FOR GAS TURBINE POWER PLANTS

Philip P. Newcomb, Manchester, Conn., assignor to United Aircraft Corporation, East Hartford, Conn., a corporation of Delaware Application July 14, 1951, Serial No. 236,759

14 Claims. (Cl. 230—116)

The present invention relates to lubrication systems for gas turbine power plants and particularly to an arrangement for pressurizing the system when the ambient pressure is so low that the lubrication and scavenge pumps might not otherwise function properly.

It is well-known that pumps require a pressure head in order that the fluid being pumped will flow into the pump. This necessary pressure head under normal atmospheric conditions is less than the usual atmospheric pressure and accordingly the atmospheric pressure itself will supply the fluid to the pumps. At high altitudes, however, the atmospheric pressure becomes so low that the fluid will not flow from the sump or tank into the pump especially if, as is frequently the case, the sump is lower than the level of the pump. A feature of this invention is an arrangement for automatically maintaining an operative pressure on the lubrication system even though ambient pressure reaches a value so low that the system will not operate.

The lubricant systems for gas turbine power plants are frequently vented to atmosphere such that the lubricating system will be operating under an atmospheric head. A feature of the invention is a device which is sensitive to atmospheric pressure and will function to close the vent for the system and to supply air under pressure to the system to maintain a predetermined minimum pressure. Another feature is the use of air from a point in the compressor where the pressure will be high enough to supply the necessary minimum pressure to the lubrication system.

Other objects and advantages will be apparent from the specification and claims, and from the accompanying drawings which illustrate an embodiment of the invention.

Fig. 1 is a side elevation of a power plant with the lubrication system shown schematically and with the pressurizing valve in section.

Fig. 2 is a sectional view through the valve of Fig. 1 at right angles to the section of Fig. 1.

Fig. 3 is a sectional view of a modified pressurizing valve.

Fig. 4 is a sectional view on line 4—4 of Fig. 3.

Fig. 5 is a sectional view along the line 5—5 of Fig. 3.

Fig. 6 is a sectional view along the line 6—6 of Fig. 3.

With reference first to Fig. 1, the gas turbine power plant includes a compressor 2 having an air inlet 4 at its upstream end and, at its delivery end, discharging air into the combustor or combustors 6. Fuel is supplied to these combustors and is burned with the air, the resulting products of combustion being discharged through the turbine 8 and thence through a thrust nozzle 10. The compressor includes a rotor 12 connected as by a shaft 14 to the turbine rotor 16. The rotor assembly is carried by spaced bearings 18 and 20 located at opposite ends of the compressor and other bearings 22 and 24 located on opposite sides of the turbine rotor. It will be understood that the power plant and the location of the bearings is diagrammatically shown and the bearings may be otherwise arranged depending upon the type of power plant.

Lubrication for the bearings is provided by a pressure pump 26 which pumps lubricant from a tank 28 through a conduit 30 to the pump and thence through a delivery conduit 32 to the several bearings. In the arrangement shown, a branch conduit 34 communicating with the conduit 32 supplies lubricant to a substantially radial passage 36 located in the compressor structure adjacent to the bearing 18. Lubricant flowing through this passage 36 is discharged onto the bearing. Another branch conduit 38 which extends from conduit 32 delivers fuel to a passage 40 located in the power plant structure adjacent to the bearing 20. This passage supplies lubricant to both bearings 20 and 22 there being a branch passage 42 to the bearing 22. The delivery conduit 32 extends to a bracket 44 located on the power plant structure adjacent to the turbine and this conduit communicates with a passage 46 through which lubricant for the bearing 24 is supplied.

Oil sumps are located adjacent each of the bearings to collect the oil escaping from the bearings. As shown, a sump 48 adjacent the bearing 18 collects the oil from this bearing. A series of scavenge pumps 50 function to remove the oil from the several sumps and return it through a return conduit 52 to the main sump or tank 28. From the sump 48 the return fluid is directed by a pipe 54 to the suction side of one of the pumps. Another sump 56 collects lubricant from bearings 20 and 22 and from this sump the lubricant flows through a passage 58 and a chamber 60 in the end of the housing 62 into one of the scavenge pumps. A sump 64 encloses bearing 24 and from this sump lubricant is returned through a passage 66 and a conduit 68 to one of the scavenge pumps.

The several sumps and the tank 28 are all vented to atmosphere. Sump 48 is vented through a passage 70 and conduit 72 to the vent valve 74. Sump 56 is vented through a radial passage 76 and a conduit 78 to the vent valve. Sump 64 is vented through a radial passage 80 and a conduit 82 into the conduit 78. Tank 28 is vented through a conduit 82 which communicates with conduit 78.

The vent or breather valve 74 in the arrangement shown is in the form of a housing having an inlet 84 with which the conduits 72 and 78 are connected. The inlet 84 is in communication with a chamber 86 which also communicates through ports 88 with a chamber 90 in a connecting housing 92. The chamber 90 communicates with the inside of a valve sleeve 94 which has ports 96 through which air is vented in the normal position of the valve. The ports 96 communicate with cooperating ports 98 in a surrounding housing 100 and the motion of the valve 94 is such as to close the ports 98 when the ambient pressure reaches a predetermined minimum as determined by an evacuated bellows 101 connected to the valve sleeve.

The chamber 90 has an end wall 102 on which is mounted on one side the bellows 101 and on the opposite side another evacuated bellows 104. The movable end of the bellows 104 is connected to the stem 106 of a valve 108 located in the chamber 86. The valve 108 is in the form of spaced discs 110 fitting in cooperating openings 112 provided by the housing and forming a balanced valve. The space between the openings 112 communicates with the compressor 2 as by a conduit 114, the connection at the compressor being at a point such that the air bled off will be above the necessary minimum pressure for the lubrication system. The valve 106 normally closes the openings 112, but as the atmospheric pressure decreases the bellows 104 expands until ultimately it moves the valve 106 far enough to allow pressure from the space between the openings 112 to enter the chamber 86. Since this chamber communicates with the sumps it is obvious that the pressure in the sumps will be maintained at a pressure determined by the bellows 104 and the coil spring 116 that resists the expansion of the bellows.

With this arrangement, as the ambient pressure decreases the sleeve valve 94 is moved into closed position and at approximately the same time the bellows 104 opens the valve 108. It will be understood that both bellows 101 and 104 are subjected to the ambient atmospheric pressure until the sleeve valve 94 is moved into port closing position. Thereafter these bellows are subjected to the pressure in chamber 90 and the arrangement is such that the valve 108 will be closed as soon as the pressure in chamber 90 reaches the selected minimum value at which the sumps are to be pressurized.

Instead of the two bellows of Figs. 1 and 2 the control valve may utilize only a single bellows as in the modifications of Figs. 3–6, inclusive. In this arrangement the casing 120 has openings 122 and 124 connecting to the breather pipes and another opening 126 communicating with the atmosphere. The casing 120 has a supporting web 128 on which is mounted an evacuated bellows 130. The movable end of the bellows is connected to a sleeve valve 132 by a supporting web 134 and is also connected to a slide valve 136 through a projecting stem 138. The sleeve valve 132 is comparable to the valve 94 and has ports 140 cooperating with similar ports 142 in a surrounding fixed sleeve 144.

The valve 136 corresponds to the valve 108 and has spaced discs 146 closing spaced openings 148 provided by a boss 150 in the casing. The space between the openings 148 is in communication through passages 152 with the compressor as by a connection similar to the conduit 114.

Compressor pressure reaches the inside of the bellows 130 through a radial passage 154 in the stem 138 and through an axial passage 156 in this stem and thence through a passage 158 in the movable end of the bellows. With this arrangement the bellows measures the pressure difference between the ambient pressure normally surrounding the bellows and the compressor pressure within the bellows. As the ambient pressure decreases the bellows expands and finally at the selected pressure, as determined by the spring 160 acting on the end of the valve stem, closes the ports 140 to cut off the space within the casing 120 from atmosphere. At the same time, the discs 146 uncover the openings 148 and allow air under pressure from the compressor to enter the casing and thus function to pressurize the scavenge sumps.

It is to be understood that the invention is not limited to the specific embodiment herein illustrated and described, but may be used in other ways without departure from its spirit as defined by the following claims.

I claim:

1. A turbine having a rotor, a bearing for the rotor, a housing for the bearing having a scavenge chamber to collect oil from the bearing, and means for pumping oil from said chamber, in combination with means for maintaining pressure in said chamber, said last means including a source of gas under pressure having a connection to said chamber, a valve in said connection, a vent for said chamber, a control valve for said vent, and pressure responsive means for moving said valves.

2. A turbine having a rotor, a bearing for the rotor, a housing for the bearing having a scavenge chamber to collect oil from the bearing, and means for pumping oil from said chamber, in combination with means for maintaining pressure in said chamber, said last means including a source of gas under pressure having a connection to said chamber, a valve in said connection, a vent for said chamber, a control valve for said vent, and ambient pressure responsive means for closing said control valve as the ambient pressure reaches a predetermined minimum.

3. A turbine having a rotor, a bearing for the rotor, a housing for the bearing having a scavenge chamber to collect oil from the bearing, and means for pumping oil from said chamber, in combination with means for maintaining pressure in said chamber, said last means including a source of gas under pressure having a connection to said chamber, a valve in said connection, a vent for said chamber, a control valve for said vent, and pressure responsive means sensitive to atmospheric pressure for closing said control valve and for opening said first valve as the atmospheric pressure decreases.

4. A turbine having a rotor, a bearing for the rotor, a housing for the bearing having a scavenge chamber to collect oil from the bearing, and means for pumping oil from said chamber, in combination with means for maintaining pressure in said chamber, said last means including a source of gas under pressure having a connection to said chamber, a valve in said connection, a vent for said chamber, a control valve for said vent, ambient pressure responsive means for closing said control valve as the ambient pressure decreases, and other pressure responsive means for opening said first valve as the ambient pressure decreases.

5. A turbine having a rotor, a bearing for the rotor, a housing for the bearing having a scavenge chamber to collect oil from the bearing, and means for pumping oil from said chamber, in combination with means for maintaining pressure in said chamber, said last means including a source of gas under pressure having a connection to said chamber, a valve in said connection, a vent for said chamber, a control valve for said vent, pressure responsive means located between the vent control valve and the chamber and a structural connection from said pressure responsive means to said valves to cause actuation of said valves from said means.

6. A turbine having a rotor, a bearing for the rotor, a housing for the bearing having a scavenge chamber to collect oil from the bearing, and means for pumping oil from said chamber, in combination with means for maintaining pressure in said chamber, said last means including a source of gas under pressure having a connection to said chamber, a valve in said connection, a vent for said chamber, a control valve for said vent, pressure responsive means located between the vent control valve and the chamber and a structural connection from said pressure responsive means to said valves to cause actuation of said valves from said means, said structural connection to the valves being so arranged that the control valve is closed and the other valve is opened as the pressure acting on the means decreases.

7. A turbine having a rotor, a bearing for the rotor, a housing for the bearing having a scavenge chamber to collect oil from the bearing, and means for pumping oil from said chamber, in combination with means for maintaining pressure in said chamber, said last means including a source of gas under pressure having a connection to said chamber, a valve in said connection, a vent for said chamber, a control valve for said vent, pressure responsive means located between the vent control valve and the chamber and a structural connection from said pressure responsive means to said valves to cause actuation of said valves from said means, said means and valves being arranged to move the control valve into closed position in response to a decrease in pressure and, subsequently after the control valve is closed, to move the other valve into open position in response to a further decrease in pressure.

8. A turbine including a rotor, spaced bearings for the rotor, housings in which said bearings are mounted, said housings having chambers to collect oil from the bearings and means for maintaining a predetermined minimum pressure in said chambers, including a source of gas under pressure having a connection to said chambers and a normally closed valve in said connection, a vent for said chambers having a connection to said chambers and a normally open control valve in said connection, pressure responsive means for closing said normally open control valve as pressure decreases and for causing said normally closed valve to open.

9. A turbine including a rotor, spaced bearings for the rotor, housings in which said bearings are mounted, said housings having chambers to collect oil from the bearings and means for maintaining a predetermined minimum pressure in said chambers, including a source of gas under pressure having a connection to said chambers and a normally closed valve in said connection, a vent for said chambers having a connection to said chambers and a normally open control valve in said connection, pressure responsive means subject to vent pressure for closing said normally open control valve as vent pressure decreases, and other pressure responsive means subject to pressure in said chambers for opening said normally closed valve as the pressure decreases.

10. A gas turbine power plant including a compressor and turbine each having a rotor, bearings for said rotors, at least one of said bearings having a supporting housing with a chamber to collect oil from the bearing, pumps for supplying oil to the bearing and for scavenging oil from the chamber, a connection from said compressor to said chamber for supplying air under pressure from said compressor to the chamber, a normally closed valve in said connection, and pressure responsive means communicating with said chamber and responsive to the pressure therein, said means being connected to said valve for causing it to open as pressure in the chamber decreases.

11. A gas turbine power plant including a compressor and turbine each having a rotor, bearings for said rotors, at least one of said bearings having a supporting housing with a chamber to collect oil from the bearing, pumps for supplying oil to the bearing and for scavenging oil from the chamber, a connection from said compressor to said chamber for supplying air under pressure from said compressor to the chamber, a normally closed valve in said connection, a vent for said chamber having a normally open valve therein, and pressure responsive means controlled by the pressure in said chamber for opening the normally closed valve and for closing the normally open valve as pressure decreases.

12. A gas turbine power plant including a compressor and turbine each having a rotor, bearings for said rotors, at least one of said bearings having a supporting housing with a chamber to collect oil from the bearing, pumps for supplying oil to the bearing and for scavenging oil from the chamber, a connection from said compressor to said chamber for supplying air under pressure from said compressor to the chamber, a normally closed valve in said connection, a vent for said chamber having a normally open valve therein, and pressure responsive means controlled by the pressure in said chamber and in the connection from the compressor for opening the normally closed valve and for closing the normally open valve as pressure in the chamber decreases.

13. An engine lubrication system including a supply tank, a pressure pump for delivering oil from said tank to said engine, a sump in which oil from the engine is collected, and a scavenge pump for returning oil from the sump to the tank, in combination with a vent for said system, a supply of air under pressure, pressure responsive means controlled by the pressure in said sump, and a valve responsive to said means for closing said vent and for connecting said supply of air under pressure to said sump when the pressure in said sump reaches a selected minimum.

14. An engine lubrication system including a supply tank, a pressure pump for delivering oil from said tank to said engine, a sump in which oil from the engine is collected, and a scavenge pump for returning oil from the sump to the tank, in combination with a vent having a connection to said system, a supply of air having a connection to said sump, valve means in said connections and pressure actuated means responsive to the pressure in said sump and connected to and moving said valve means for closing the vent for admitting air under pressure from the supply to said sump when the sump pressure reaches a selected minimum.

PHILIP P. NEWCOMB.

References Cited in the file of this patent

UNITED STATES PATENTS

| Number | Name | Date |
|---|---|---|
| 2,370,581 | Reed | Feb. 27, 1945 |
| 2,464,063 | Streid | Mar. 8, 1949 |